United States Patent Office 2,924,610
Patented Feb. 9, 1960

2,924,610

17α-BROMO-6α-FLUOROPROGESTERONE

David J. Marshall, Westmount, Quebec, Canada, assignor to American Home Products Corporation, New York, N.Y., a corporation of Delaware No Drawing. Application October 14, 1958
Serial No. 767,091

1 Claim. (Cl. 260—397.3)

This invention relates to steroid compounds and is more particularly concerned with 17α-bromo-6α-fluoro-4-pregnen-3,20-dione (17α-bromo-6α-fluoroprogesterone), intermediates in the production thereof, and a process for their preparation.

The new compounds and the process of the present invention may be illustratively represented as follows:

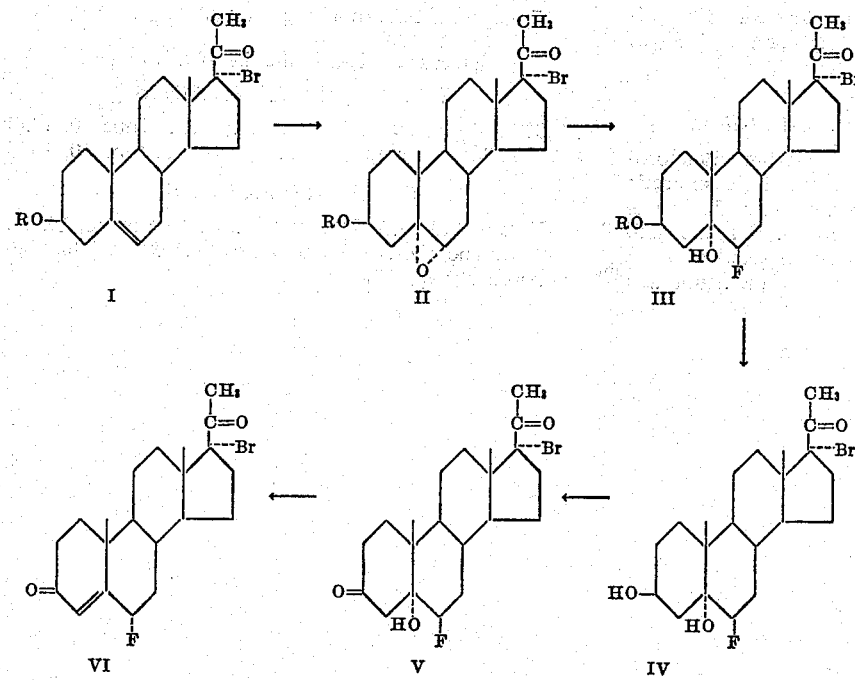

wherein R is an acyl radical of hydrocarbon carboxylic acid containing from 1 to 12 carbon atoms inclusive.

The process of the present invention starts with 3-acylates of the known compound 17α-bromopregnenolone. 17α-bromopregnenolone is described in a publication by Engel and Jahnke, Can. J. Biochem. Physiol., 35, 1047 (1957).

The 3-acylates of the known 17α-bromopregnenolone (I) are treated with a peracid such as peracetic, perbenzoic, and monoperphthalic to obtain 17α-bromo-3β-acyloxy-5α,6α-epoxypregnan-20-one (II). The epoxide II is allowed to react with a fluorinating agent such as hydrogen fluoride or boron trifluoride to give 17α-bromo-3β-acyloxy-6β-fluoro-5α-hydroxypregnan-20-one (III). The fluorohydrin III is hydrolyzed under acid conditions, for example with perchloric acid in methanol, to yield 17α-bromo-6β-fluoro-3β,5α-dihydroxypregnan-20 - one (IV). The dihydroxy compound IV is treated with an oxidizing agent, such as sodium dichromate in acetic acid, to give 17α-bromo-6β-fluoro-5α-hydroxypregnan-3,20-dione (V). The hydroxy-diketone V is dehydrated and the configuration at carbon atom No. 6 is inverted by treatment with a strong mineral acid such as hydrochloric acid to yield 17α-bromo-6α-fluoro-4-pregnen-3,20-dione (17α-bromo-6α-fluoroprogesterone) (VI).

The compounds of this invention are useful as progestational agents. 17α-bromo-6α-fluoroprogesterone is progestationally active when administered either orally or subcutaneously.

The following examples, which are to be construed as illustrative rather than limiting, give details of the products and processes of the present invention.

EXAMPLE 1

17α-bromopregnenolone acetate (I)

A mixture of 5.0 grams of 17α-bromopregnenolone, 35 ml. of acetic anhydride, and 0.2 gram of p-toluenesulfonic acid was warmed until the steroid had all dissolved. On cooling, 17α-bromo-pregnenolone acetate precipitated, which, after filtering, washing with water and drying, melted at 148–150° C.

Similarly, other esters of 17α-bromopregnenolone may be prepared by treating 17α-bromopregnenolone, in the presence of an acidic or basic catalyst, with the anhydrides or acyl halides of organic carboxylic acids, particularly hydrocarbon carboxylic acids, containing from one to twelve carbon atoms, inclusive.

EXAMPLE 2

17α-bromo-3β-acetoxy-5α,6α-epoxypregnan-20-one (II)

To a solution of 2.00 grams of 17α-bromopregnenolone acetate in 60 ml. of chloroform cooled to 10° C. was added a solution of 0.93 gram of monoperphthalic acid in 27.5 ml. of ether. The mixture was left at room temperature for 42 hours, filtered from insoluble material, washed with 10 percent sodium bicarbonate solution and water, dried, and evaporated. The solid residue was recrystallized from ethyl acetate, yielding 17α-bromo-3β-acetoxy-5α,6α-epoxypregnan-20-one, melting at 187–189.5° C.

EXAMPLE 3

*17α-bromo-3β-acetoxy-6β-fluoro-5α-hydroxypregnan-20-one (III)*

To a solution of 2.4 gram of 17α-bromo-3β-acetoxy-5α,6α-epoxypregnan-20-one in 30 ml. of methylene chloride in a polyethylene bottle was added 4.8 grams of 48 percent hydrofluoric acid, and the mixture was stirred magnetically for 3.5 hours. Excess aqueous sodium bicarbonate solution was added, and the methylene chloride solution was washed with water, dried, and concentrated. By crystallization from a mixture of methylene chloride and methanol, a sample of 17α-bromo-3β-acetoxy-6β-fluoro-5α-hydroxypregnan-20-one was obtained with a melting point of 170° C. (dec.).

EXAMPLE 4

*17α-bromo-6β-fluoro-3α,5α-dihydroxypregnan-20-one (IV)*

A mixture of 0.20 gram of 17α-bromo-3β-acetoxy-6β-fluoro-5α-hydroxypregnan-20-one, 4 ml. of methanol, and 0.15 ml. of 70 percent perchloric acid was heated until the solid had dissolved and then left at room temperature for 17 hours. The crystalline solid which precipitated on dilution with water was recrystallized from methanol-water, yielding 17α-bromo-6β-fluoro-3β,5α-dihydroxypregnan-20-one with a melting point of 168° C. (dec.).

EXAMPLE 5

*17α-bromo-6β-fluoro-5α-hydroxypregnan-3,20-dione (V)*

To a solution of 2.5 grams of 17α-bromo-6β-fluoro-3β,5α-dihydroxypregnan-20-one in 20 ml. of glacial acetic acid cooled to 15° C. was added a solution of 2.5 grams of sodium dichromate dihydrate in 50 ml. of acetic acid, and the resulting mixture was allowed to stand at room temperature for 17 hours. Five ml. of methanol was then added, followed by 125 ml. of water. The precipitated solid was filtered, dried and recrystallized from isopropanol, yielding 17α-bromo-6β-fluoro-5α-hydroxypregnan-3,20-dione melting at 176° C. (dec.).

EXAMPLE 6

*17α-bromo-6α-fluoroprogesterone (VI)*

A suspension of 1.6 grams of 17α-bromo-6β-fluoro-5α-hydroxypregnan-3,20-dione in 50 ml. of acetic acid was cooled to about 15° C. and anhydrous hydrogen chloride was passed through the mixture for one hour. The solid dissolved to give a yellow solution during the first 15 minutes. After standing for an additional hour, the solution was cooled in ice and 75 ml. of water was added slowly which precipitated 1.3 grams of a yellowish solid. This product was dissolved in benzene and chromatographed on 40 grams of neutral alumina. Elution with 500 ml. of benzene yielded 1.2 grams of colorless solid which was crystallized from a mixture of acetone and hexane. The 17α-bromo-6α-fluoroprogesterone thus obtained melted at 173.5–176.5° C. (dec.). It had an ultraviolet absorption maximum at 237 millimicrons, and infrared maxima, in carbon disulfide solution, at 1710 and 1690 cm.$^{-1}$

I claim:

17α-bromo-6α-fluoro-4-pregnen-3,20-dione.

References Cited in the file of this patent

UNITED STATES PATENTS

| | | |
|---|---|---|
| 2,838,502 | Beal et al. | June 10, 1958 |
| 2,838,528 | Campbell et al. | June 10, 1958 |

OTHER REFERENCES

Oliveto et al.: J.A.C.S., 80, page 4431 (Aug. 20, 1958).
Fieser and Fieser: "Natural Products Related to Phenanthrene," page 228.

UNITED STATES PATENT OFFICE
CERTIFICATE OF CORRECTION

Patent No. 2,924,610                  February 9, 1960

David J. Marshall

It is hereby certified that error appears in the printed specification of the above numbered patent requiring correction and that the said Letters Patent should read as corrected below.

Column 1, line 52, for "of hydrocarbon" read -- of a hydrocarbon --; line 72, for "dehydrate" read -- dehydrated --; column 3, lines 17 and 18, the italicized heading to EXAMPLE 4 should appear as shown below instead of as in the patent:

$17\alpha$-bromo-$6\beta$-fluoro-$3\beta$,$5\alpha$-dihydroxy-
pregnan-20-one (IV)

Signed and sealed this 11th day of October 1960.

(SEAL)
Attest:

KARL H. AXLINE
Attesting Officer

ROBERT C. WATSON
Commissioner of Patents